United States Patent [19]
Nelson

[11] 3,964,967
[45] June 22, 1976

[54] TAG GAS CAPSULE WITH MAGNETIC PIERCING DEVICE

[75] Inventor: Ira V. Nelson, Richland, Wash.

[73] Assignee: The United States of America as represented by the United States Energy Research and Development Administration, Washington, D.C.

[22] Filed: Feb. 24, 1975

[21] Appl. No.: 552,398

Related U.S. Application Data

[63] Continuation of Ser. No. 403,309, Oct. 3, 1973, abandoned.

[52] U.S. Cl. .............................. 176/80; 176/19 LD
[51] Int. Cl.² ........................................ G21C 3/16
[58] Field of Search ......................... 176/80, 19 LD

[56] References Cited
UNITED STATES PATENTS

| | | | |
|---|---|---|---|
| 3,157,580 | 11/1964 | Williams | 176/80 |
| 3,350,271 | 10/1967 | Maidment et al. | 176/80 |
| 3,632,470 | 1/1972 | Rubin et al. | 176/19 LD |

OTHER PUBLICATIONS

Transactions of ANS, vol. 13, No. 2, Nov. 13, 1970, pp. 797, 798.

*Primary Examiner*—Harvey E. Behrend
*Attorney, Agent, or Firm*—John A. Horan; Robert M. Poteat; Keith R. Sharp

[57] ABSTRACT

An apparatus for introducing a tag (i.e., identifying) gas into a tubular nuclear fuel element. A sealed capsule containing the tag gas is placed in the plenum in the fuel tube between the fuel and the end cap. A ferromagnetic punch having a penetrating point is slidably mounted in the plenum. By external electromagnets, the punch may be caused to penetrate a thin rupturable end wall of the capsule and release the tag gas into the fuel element. Preferably the punch is slidably mounted within the capsule, which is in turn loaded as a sealed unit into the fuel element.

2 Claims, 3 Drawing Figures

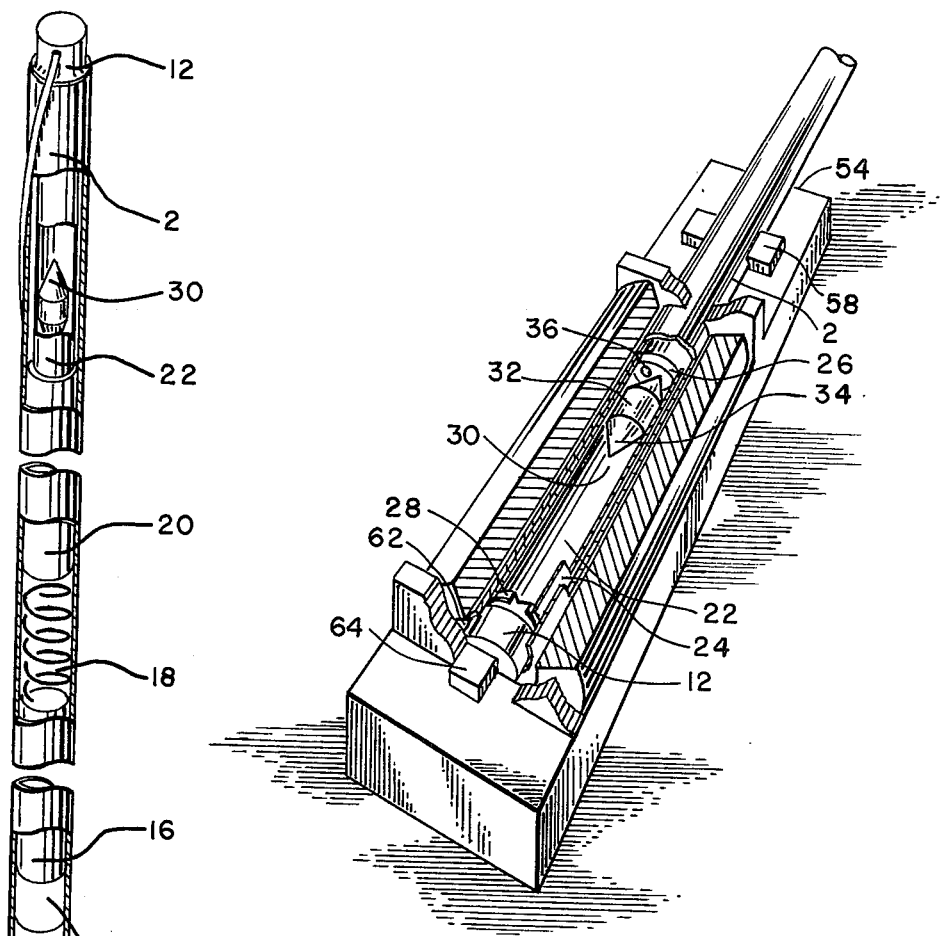
Fig. 2
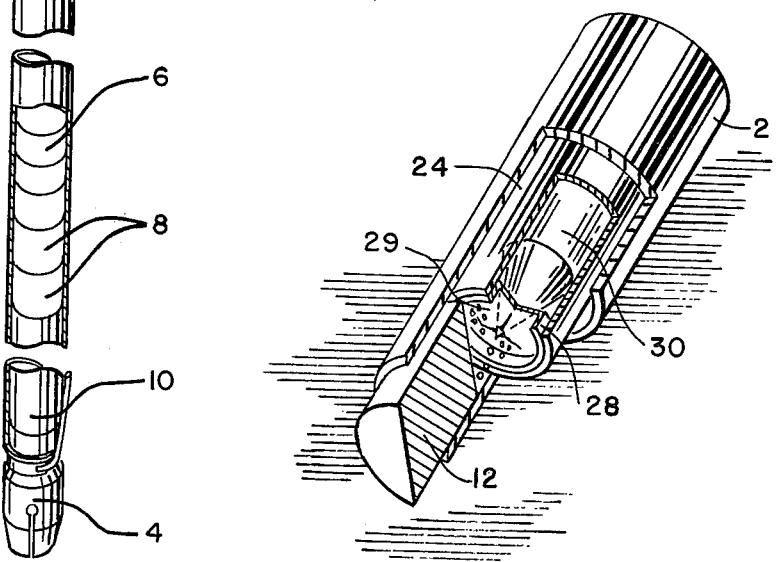
Fig. 1
Fig. 3

TAG GAS CAPSULE WITH MAGNETIC PIERCING DEVICE

CONTRACTUAL ORIGIN OF THE INVENTION

The invention described herein was made in the course of, or under, a contract with the United States Atomic Energy Commission.

This is a continuation of application Ser. No. 403,309, filed Oct. 3, 1973, now abandoned.

BACKGROUND

This invention relates generally to gas tagged nuclear fuel elements and more specifically to a capsule for introducing tag gas into nuclear fuel elements.

During the operation of nuclear reactors there may be a failure of the cladding resulting in release of radioactive fission products to the coolant and ultimately to the environment. Moreover, coolant may enter the failed fuel element and react with the fuel, causing further damage. It is therefore highly desirable to have some means of detecting a cladding failure.

It is also highly desirable to locate, as nearly as possible, the fuel element which has failed.

In liquid metal cooled fast reactors the coolant is blanketed by an inert cover gas. In water-cooled reactors there is a gradual evolution of non-condensable off-gases produced in part by dissociation of the water. Other reactors are cooled by gas, e.g., carbon dioxide or helium. One method detecting a fuel cladding failure in any of these types of reactors is by analysis of the gas.

In order to indicate and identify a fuel element failure, it is known to introduce specific mixtures of different isotopes of, e.g., neon, xenon or krypton into the fuel elements. By using different isotopic mixtures in different subassemblies of the reactor core it is possible to determine the location of the failed fuel element. This is done by subjecting the gas to mass spectrometric analysis. It is then possible to remove the fuel assembly containing the defective fuel element.

The above method is described in U.S. Pat. No. 3,632,470 to Rubin et al., U.S. Pat. No. 3,663,363 to Crouthamel et al., and U.S. Atomic Energy Commission report BNWL-1200-4, pages 4.38 to 4.44. This method has come to be known as "tagging" and the isotopic mixture has come to be known as the "tag gas."

One problem in connection with the tagging has been the manner of introduction of the tag gas into the fuel element. The fuel elements ordinarily contain a fill gas, usually helium, in addition to the nuclear fuel. The helium is normally introduced by placing the fuel tube containing nuclear fuel in a chamber which contains a welding apparatus, evacuating the chamber, backfilling with helium, inserting the end cap into the end of the fuel tube, then welding the end cap to the fuel tube. While the tag gas can be added to the helium during the backfilling step, this is wasteful of the tag gas, which is relatively expensive. Moreover, in some cases, the tag gas may include a radioactive isotope which should not be released into the helium which escapes from the chamber after the welding step. To avoid this problem, the tag gas has been, in one prior art method, enclosed in a capsule fitted with a punch attached to a bimetallic element which causes the punch to penetrate the capsule when a certain temperature is reached in the reactor. See Henault et al., American Nuclear Society Transactions, Vol. 13, page 798 (1970). However, since the puncturing does not take place until the fuel is in the reactor, there is no way to be sure that the intended release of the gas from the capsule has actually taken place.

It is an object of this invention to provide a means for releasing tag gas from a capsule within a fuel element which will be positive in operation, which can be operated before the fuel element is placed in the reactor, and which is subject to nondestructive inspection to verify its operation.

SUMMARY OF THE INVENTION

According to the present invention, the above and other objects are attained by providing within a nuclear reactor fuel element a ferromagnetic punch which is actuated by external electro-magnets and driven against a thin rupturable end wall of a sealed capsule, penetrating the capsule and releasing a sealed tag gas into the fuel element. Preferably, the punch is slidably mounted within a sealed non-magnetic tag gas capsule and has a double-ended penetrating portion.

Advantageously, the standard nondestructive testing of the weld quality between the end cap and the fuel tube, such as by X-ray or radiographic inspection, serves to verify penetration of the sealed capsule and release of the tag gas around the loosely-fitting capsule into the fuel element.

DESCRIPTION OF DRAWINGS

FIG. 1 is a longitudinal section of a nuclear reactor fuel element incorporating the tag gas capsule of the invention.

FIG. 2 is a diagrammatic view of the actuating system showing the punch of the cocked position.

FIG. 3 is a broken view of one end of a fuel element showing the punch after penetration of the capsule.

DETAILED DESCRIPTION

FIG. 1 shows a typical fuel element for nuclear reactors involving this invention. It comprises a fuel tube 2 preferably made of a substantially non-magnetic structural material, such as type 316 stainless steel, zircaloy-2 or zircaloy-4. It is closed at the lower end by a bottom end cap 4 which is welded in place. Within the tube is a stack of fuel pellets 6, made of uranium dioxide enriched in uranium-235, or a mixture of uranium dioxide and plutonium dioxide. Between the fuel and the lower end cap are lower insulator pellets 3, formed of aluminum oxide or uranium dioxide depleted of uranium-235. A neutron reflector 10 made of a high nickel alloy may also be provided.

The upper end of fuel tube 2 is closed by upper end cap 12. The column formed by the fuel pellets 6, upper insulator pellets 14 and upper reflector 16 is spaced from the upper end cap 12 to form a plenum filled with helium. The spacing is produced by a plenum spring 18, a hollow cylindrical plenum spacer 20 and the tag gas capsule 22.

The tag gas capsule 22 is shown in more detail in FIGS. 2 and 3. It includes a cylindrical casing 24 closed at one end by bottom plug 26 and at the other by a rupture cup 28, which includes a thin diaphragm 29 which is, e.g. about 0.004 inch thick. It is preferably made of annealed 316 stainless steel. The capsule is preferably positioned with the rupture cup at the upper end so that end cap 12 will act as an anvil. The rupture cup serves to space diaphragm 29 from the end cap to permit penetration by punch 30. Bottom plug 26 is relatively thick, e.g., 0.020 inch. A punch 30 is slidably housed within capsule 22. The punch has a body portion 32 and at least one sharp pointed penetration portion 34. Preferably the punch is made double-ended so that it cannot be inserted incorrectly. The penetrating portion may be integral with the body portion or it may be separate, but suitably secured to the body portion. The body portion, at least, of the punch is made of a metal which is strongly ferromagnetic, for example, type 410 stainless steel. The casing 24, on the other hand, is made of a material which is nonmagnetic or at least only weakly magnetic, e.g., zircaloy-2 or type 310 cold worked stainless steel, to minimize magnetic shielding of the punch.

The actual loading of the capsule with a tag gas may be carried out in conventional equipment. The bottom plug 26 may, for example, be drilled by a laser beam, to provide a small hole 36. The capsule is then evacuated and backfilled with the desired mixture of isotopes such as xenon - krypton gas mixtures. The hole 36 is then closed, e.g., by laser welding. It should be apparent that multiple capsules may be loaded by this technique simultaneously and due to the cost savings, multiple loading is preferred.

OPERATION

The operation whereby the tag gas is released from the sealed capsule 22 into the fuel element is shown diagrammatically in FIGS. 2 and 3.

A support block 54 is provided with a guide groove. The support block may be positioned horizontally on a suitable table or work bench. Intermediate in lengths are one or more permanent magnets 58 which are mounted adjacent the guide groove. Electric coil 60 which is mounted at one end of support block 54 has a bore 62 aligned with the guide groove. At its terminal end coil 60 has a microswitch 64, which is connected to coil 60 through a circuit which delivers a short but heavy pulse of current.

After the capsule 22 has been placed in the fuel tube and upper end cap 12 welded in place, the fuel element is placed in the groove of block 54 with end cap 12 to the right of magnets 58 in FIG. 2. The fuel element is then slid along the groove past magnets 58 which move punch 30 to the bottom of the capsule 22, adjacent bottom plug 26 as shown in FIG. 2. This is termed the "cocked" position of the punch. When the end plug 12 contacts microswitch 64 a strong pulse of current is sent through coil 60. This drives punch 30 toward rupture cup 28. The current is cut off when punch 30 reaches the midpoint of coil 60. The punch 30 strikes and penetrates diaphragm 29 of rupture cup 28, as shown in FIG. 3. The gas escapes into the remainder of the fuel element. The stainless steel diaphragm 29 tears irregularly, releasing punch 30, which drops back as soon as the fuel element is placed upright.

To ensure that the punch has penetrated the diaphragm, the piercing operation may be repeated. This is done by drawing the fuel rod to the right in FIG. 2 until end cap 12 has cleared magnets 28, then sliding it to the left again cocking the punch and then driving it against the diaphragm a second time.

While I have shown and described the presently preferred embodiment of the invention, various changes can be made. For example, the punch might be placed outside the capsule, e.g., in plenum spacer 20. In this modification, the diaphragm 29 would of course be at the bottom of capsule 29.

I therefore wish the invention to be limited solely by the scope of the appended claims.

The embodiments of the invention in which an exclusive property or privilege is claimed are defined as follows:

1. In a fuel element for a nuclear reactor comprising a substantially nonmagnetic fuel tube, an end cap closing one end of said fuel tube, a multiplicity of stacked fuel pellets disposed within said tube and spaced from said end cap to form a plenum, the improvement comprising a substantially nonmagnetic sealed capsule fitting within said plenum with one end adjacent said end cap and containing an isotopic mixture of gases, said capsule having at said one end a thin, rupturable diaphragm spaced inwardly from said end cap of said fuel tube, and a ferromagnetic punch having a sharp-pointed penetrator on at least one end, freely slidably movable longitudinally within said capsule, said punch having a length much less than that of said capsule and said penetrator being on the end of said punch pointed toward said diaphragm whereby said punch can be driven against said rupturable diaphragm in response to an external magnetic field induced around said fuel tube so that said rupturable diaphragm is breached by said penetrator and said isotopic mixture of gases is released from said sealed capsule into said fuel element.

2. A device as defined in claim 1 wherein said fuel tube comprises type 316 stainless steel, said capsule comprises type 316 stainless steel and said ferromagnetic punch comprises type 410 stainless steel.

* * * * *